J. K. Babcock,
Wind Wheel.
Nº 30,038.   Patented Sep. 18, 1860
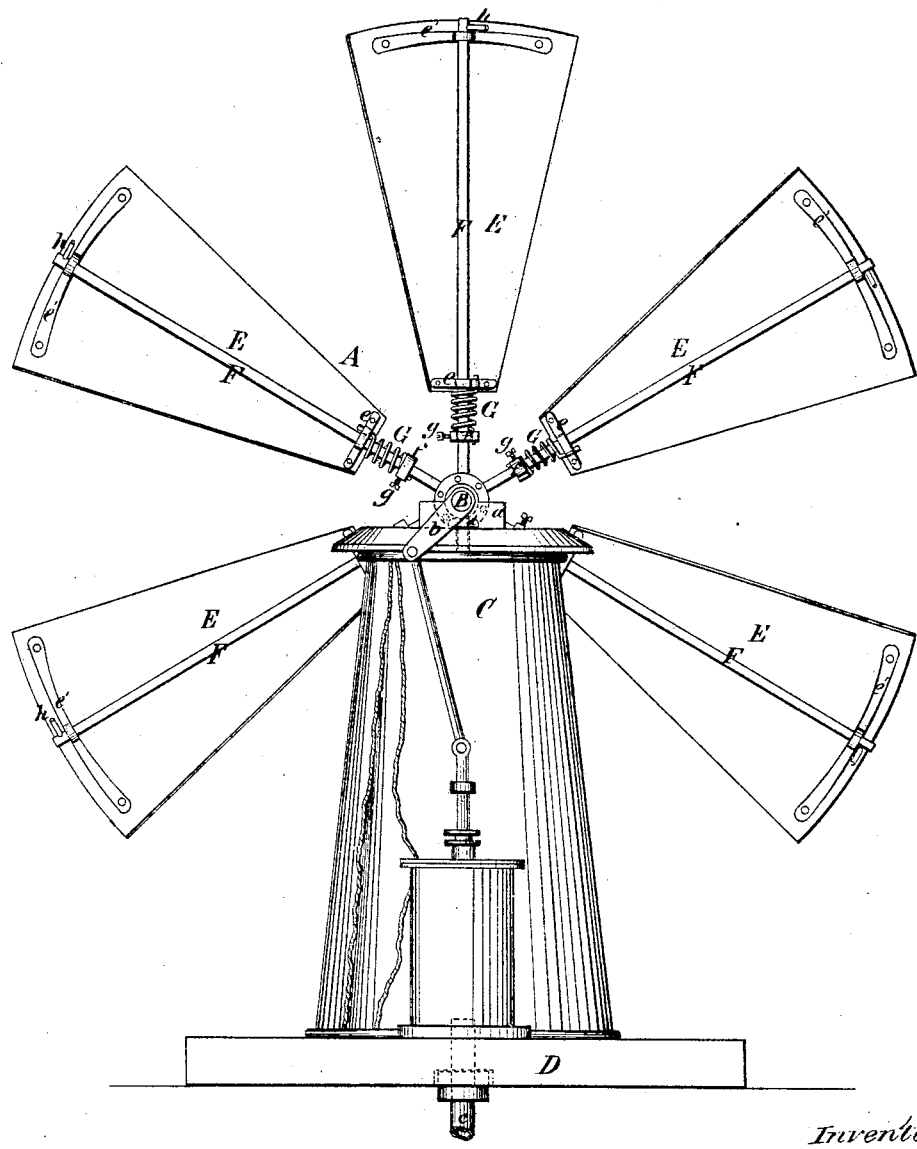
Witnesses
J. W. Coombs
R. S. Spencer
Inventor
J. K. Babcock
John Munroe
Attorneys

UNITED STATES PATENT OFFICE.

JABEZ K. BABCOCK, OF CANANDAIGUA, NEW YORK.

IMPROVEMENT IN WINDMILLS.

Specification forming part of Letters Patent No. 30,038, dated September 18, 1860.

*To all whom it may concern:*

Be it known that I, JABEZ K. BABCOCK, of Canandaigua, in the county of Ontario and State of New York, have invented certain new and useful Improvements in Windmills; and I do hereby declare that the following is a full, clear, and exact description of the same, reference being had to the accompanying drawing, forming a part of this specification.

Said drawing represents a rear elevation of my invention.

My invention consists in combining with a wind-wheel a rotary hollow air-tight tower that serves as the receiver of air, which may be compressed by a suitable pump connected to the wind-wheel, said tower being provided with a hollow tubular center to draw off the air which may have been compressed in the same.

To enable those skilled in the art to make and use my invention, I will proceed to describe its construction and operation with reference to the drawing.

The wind-wheel A is firmly attached to one end of a shaft B, which has its bearings in boxes $a$ on the top of the tower C. The other end of the shaft B bears a crank $b$, which is to connect to a pump of any desired construction.

The tower C is made hollow, and it is constructed of sheet-iron or any other suitable material of sufficient strength to resist the desired pressure. It rests on a platform D, being fastened to the same by means of a tube $c$, which emanates from the center of its bottom, and which serves to carry off the compressed air. The tower, together with all its appendages, is made to rotate easily on the platform D, being guided by the hollow center $c$, and it may be placed on suitable friction-rollers to facilitate this rotary motion. The object of this motion is to allow the wind-wheel A to set itself according to the wind, so that it works to the best advantage. A vane may be connected with the tower to control its position. The tower C is furnished with a safety-valve $d$ to provide against accidents from an excess of pressure, and the air compressed in the receiver or tower C is conducted through the hollow center $c$ to the engine which it is intended to drive.

The sails or wings E of my wind-wheel are attached to the arms F by means of loops $e\ e'$, which allow said wings to turn freely on the arms, and these loops are a little on one side, giving one side of the wing an excess over the other, so that the same when exposed to the wind have a tendency to turn edgewise to the wind and to produce no rotary motion. In order to keep the wings in the proper position, I use springs G, the outer ends of which are attached to the loops $e$, while their inner ends are connected to heads $f$, which are adjustable on the arms by means of set-screws $g$. Stops $h$ on the outer ends of the arms prevent the wings turning back any farther than may be desirable. With an ordinary wind the sails or wings retain their position; but if the wind blows too strong they turn against the springs G, and the injurious effect of a strong wind on the wind-wheel and the machinery which may be attached to the same is obviated.

The power necessary to turn the wings is determined by the springs G, and the tension of these springs is adjusted by turning the heads $f$ in one direction or in the other. This arrangement is very simple and it produces a strong, durable, and powerful wind-wheel.

Having thus fully described my invention, what I claim as new, and desire to secure by Letters Patent, is—

The arrangement of a hollow rotary tower C, with a hollow center $c$, in combination with the wind-wheel A, constructed and operating substantially as and for the purpose described.

JABEZ K. BABCOCK.

Witnesses:
A. A. BROWN,
G. M. CHAPMAN.